United States Patent [19]

Hoehne et al.

[11] 4,206,093

[45] * Jun. 3, 1980

[54] PROCESS FOR THE PREPARATION OF CHLORINATED POLYMERS

[75] Inventors: Klaus Hoehne; Johann Jelen; Diez Heine, all of Leverkusen; Rolf Baatz, Dormagen, all of Fed. Rep. of Germany

[73] Assignee: Bayer Aktiengesellschaft, Leverkusen, Fed. Rep. of Germany

[ * ] Notice: The portion of the term of this patent subsequent to Mar. 13, 1996, has been disclaimed.

[21] Appl. No.: 791,546

[22] Filed: Apr. 27, 1977

[30] Foreign Application Priority Data

May 3, 1976 [DE] Fed. Rep. of Germany ....... 2619523

[51] Int. Cl.² .............................. C08F 8/20; C08F 8/22
[52] U.S. Cl. ................................... 260/3.3; 260/17 R; 260/22 CB; 260/22 XA; 525/104; 525/105; 525/106; 525/164; 525/175; 525/177; 525/214; 525/215; 525/356; 525/358; 528/482; 528/500
[58] Field of Search ................ 528/482, 500; 526/42, 526/43; 525/104, 105, 106, 164, 175, 177, 214, 215, 356, 358

[56] References Cited

U.S. PATENT DOCUMENTS

| | | | |
|---|---|---|---|
| 2,067,172 | 1/1937 | Carothers | 525/330 |
| 2,232,429 | 2/1941 | Bennett | 260/735 |
| 3,005,812 | 10/1961 | Wohlers et al. | 526/43 |
| 3,525,730 | 8/1970 | Nutzel et al. | 526/43 |
| 3,664,978 | 5/1972 | Uraneck et al. | 528/482 |
| 4,122,249 | 10/1978 | Padget | 526/43 |
| 4,144,203 | 3/1979 | Holhne et al. | 260/3.3 |

FOREIGN PATENT DOCUMENTS 1229343  4/1971 United Kingdom .
1442878  7/1976 United Kingdom .

*Primary Examiner*—William F. Hamrock
*Attorney, Agent, or Firm*—Connolly and Hutz

[57] ABSTRACT

A process for the preparation of chlorinated aliphatic polymers wherein chlorine-free polymers are chlorinated by using gaseous chlorine in chlorinated hydrocarbons as solvents and the chlorinated aliphatic polymers are recovered from the chlorinating solution by steam distillation in which process from 15 to 50% by weight of a lacquer resin is added to the chlorinating solution before steam distillation. The chlorinated polymers contain less residual solvent.

3 Claims, No Drawings

PROCESS FOR THE PREPARATION OF CHLORINATED POLYMERS

Chlorinated aliphatic polymers, for example the chlorination products of natural rubber, polyisoprene, polyethylene or polypropylene are useful as binders, e.g. for paints, adhesives and printing inks. They can be obtained by chlorinating the corresponding chlorine-free polymers with gaseous chlorine in solvents consisting of chlorinated hydrocarbons such as carbon tetrachloride, trichloroethylene, chloroform or tetrachloroethane.

Besides pigments and possibly solvents, the paints, adhesives and printing inks produced from these chlorinated polymers can also contain other binders, which will hereinafter be referred to as "lacquer resins".

Chlorinated polymers are produced on a technical scale by dissolving the chlorine-free polymer in a chlorine-resistant solvent at temperatures of from 60° to 120° C., introducing gaseous chlorine until the desired degree of chlorination has been reached and then recovering the chlorinated polymer from the reaction solution, for example, by precipitating it from the reaction solution using an organic liquid (aliphatic alcohols, such as methanol and liquid aliphatic hydrocarbons having boiling points up to 250° C., such as petroleum hydrocarbons or white spirits, for example) in which it is insoluble, but which is miscible with the chlorine-resistant solvent. Since this method requires processing of large quantities of a solvent mixture, it is usally preferred to recover the chlorinated polymer from the reaction solution by steam distillation. The chlorinated polymers obtained in this way, which are still moist with water or solvent, are then dried in the conventional manner.

The solid chlorinated polymer obtained in this way still contains substantial quantities of chlorine-resistant solvents, such as carbon tetrachloride, trichloroethylene or tetrachloroethane, which are all highly toxic and volatile substances. The polymer contains, on average, from about 6 to 10% by weight of such solvents. These solvent residues cannot be removed by distillation or drying, but a suitable solvent, such as toluene, methanol or methyl ethyl ketone, must be added to the solid chlorinated polymer before or after it has been dried and the mixture has to be redistilled. This additional procedure requires elaborate apparatus and uses up a large amount of energy.

It is an object of the present invention to provide a process whereby chlorinated polymers containing greatly reduced amounts of chlorinated solvents are obtained without the use of special apparatus or excessive expenditure of energy. It is, after all, also necessary for the sake of protection of the environment to reduce the quantity of chlorinated solvents in the polymers. The toxic solvent residues are generally liberated in vapour form when the polymers are subsequently used, for example, whey they are redissolved or when a coat of paint produced from such polymers is left to dry slowly. This is very undesirable from the point of view of industrial hygiene. Moreover, it is also necessary for technological reasons to reduce the quantity of these solvents in the polymers as their vapours are corrosive to many substances. For most purposes, it is sufficient to reduce the quantity of residual solvents to about half.

The solution to this problem lies in the finding that when lacquer resins, which are in any case required, are added to the solution of chlorinated polymers in chlorine-resistant solvents before the polymers are recovered as solids by steam distillation, the solvent content of the solid chlorinated polymer obtained is considerably reduced, e.g. to less than 1% by weight.

The present invention therefore relates to a process for preparing chlorinated aliphatic polymers by chlorination of the corresponding chlorine-free polymers using gaseous chlorine in chlorinated hydrocarbons as solvent and isolation of the chlorinated aliphatic polymers from the chlorination solution by steam distillation, wherein from 15 to 50% by weight of a lacquer resin is added to the chlorinating solution before steam distillation is carried out.

Aliphatic polymers which may be subjected to this process include, in particular, diene rubbers, such as natural rubber, polyisoprene and polybutadiene, and α-olefin polymers, such as polyethylene, polypropylene and ethylene-propylene copolymers.

Suitable lacquer resins are in principle, any polymers which may be cured in the air, by heat or by catalysts. Particularly suitable are alkyd resins, e.g. reaction products of long chain unsaturated fatty acids, benzoic acid, trimethylolpropane and phthalic acid anhydride; urethane-formaldehyde resins, such as the condensation products of butyl urethane and formaldehyde; melamine-formaldehyde resins, urea-formaldehyde resins, polymers and copolymers of alkyl-(meth)acrylates, such as polyethylacrylate or polybutylacrylate; copolymers of vinyl isobutylethers; copolymers of ethyl acrylate or butyl acrylate with vinyl acetate; xylene-formaldehyde resins, aldehyde and ketone resins; silicone resins, e.g. resins comprising the units $C_6H_5SiO_{3/2}$ $(CH_3)_2SiO$ and $C_6H_5(CH_3)SiO$; cellulose derivatives, e.g. mixed cellulose esters with acetic acid and butyric acid containing small quantities of hydroxyl groups; and hydrocarbon resins, e.g. solid distillation products obtained from the distillation of petroleum hydrocarbon and tar having melting points in the range of from 60° to 140° C.

Polymers of alkyl esters of methacrylic acid having from 2 to 6 carbon atoms in the alkyl group are particularly preferred. Both homopolymers of such an ester and copolymers of several such esters may be used. Examples are: polyethyl methacrylate and copolymers of ethyl methacrylate and n-butyl methacrylate.

It is known from German Offenlegungsschrift No. 2,359,461 that the solvent content of the finished product may be reduced by adding plasticizers or lacquer resins to chlorinated aliphatic polymers during their preparation, but the quantities described there are from 2 to 14%, by weight. It cannot be predicted from this known method that it would be possible to use lacquer resins in quantities of up to 50% since one would not expect to reduce the solvent content still further and at the same time obtain a satisfactory, high quality end product by adding such large quantities of lacquer resin.

The process is generally carried out as follows:

EXAMPLES (A) Preparation of the chlorinated polymer

1. Chlorinated 1,4-cis-polyisoprene 1,4-cis-polyisoprene is dissolved in carbon tetrachloride at 70° C. with the aid of azoisobutyric acid dinitrile. Gaseous chlorine is introduced into the resulting solution at from 50° to 60° C. until the polymer has a chlorine content of from 64 to 70%, preferably from 66 to 67%. The solution is freed from dissolved gases by boiling.

2. Chlorinated natural rubber

Natural rubber of First Latex Crepe quality is dissolved in carbon tetrachloride at 80° C. with the addition of benzene sulphonic acid hydrazide. Gaseous chlorine is introduced into the solution at from 50° to 60° C. until the polymer has a chlorine content of from 64 to 70%, preferably from 65 to 66%. The solution is freed from dissolved gases by boiling.

3. Chlorinated polyethylene

Polyethylene having a molecular weight of about 3000 is dissolved in carbon tetrachloride at boiling point and chlorinated by introduction of gaseous chlorine at 65° C. until the polymer has a chlorine content of from 63 to 70%, preferably from 64.5 to 65.5%. The solution is freed from dissolved gases by boiling.

4. Chlorinated polypropylene

Gaseous chlorine is introduced at 70° C. into a suspension in carbon tetrachloride of isotactic polypropylene which has a reduced specific viscosity $\eta_{red}$ of 5 dl/g (method of measurement: c=0.1 in decalin at 135° C.) until the polymer has gone into solution and aquired a chlorine content of from 62 to 66%, preferably from 64 to 65%. The solution is degasified by boiling.

(B) Working-up

EXAMPLE 1 (Comparison example)

A solution of 100 g of chlorinated 1,4-cis-polyisoprene (chlorine content 66%, viscosity 20 cP as a 20% solution in toluene at 20° C., measured in a Hoppler viscosimeter) in 650 g of carbon tetrachloride obtained as in Example (A) 1 is adjusted to pH 11 using 5% aqueous soda solution without the addition of any other components. The resulting emulsion is stirred into water at 90° C. in the course of 2 hours. A mixture of solvent and steam is driven off by additional heating. The precipitated chlorinated 1,4-cis-polyisoprene is filtered off and dried in a vacuum drying cupboard at 80° C. The dry product contains 8.9%, by weight, of carbon tetrachloride.

EXAMPLE 2

40 g of a copolymer of butyl methacrylate and ethyl methacrylate are added to a solution of 160 g of chlorinated 1,4-cis-polyisoprene (66% chlorine content; viscosity 10 cP determined on a 20% solution in toluene at 20° C. in a Hoppler viscosimeter) in 700 g of carbon tetrachloride, and the reaction mixture is adjusted to pH 9-10 using 5% aqueous soda solution. The resulting emulsion is sprayed into water at 90° C. in the course of about 1 hour. A mixture of solvent and steam is driven off by additional heating. A white, pulverulent product is obtained by drying in a vacuum at from 70° to 80° C. (viscosity of a 20%, by weight, solution in toluene measured as indicated above is 22 cP). The carbon tetrachloride content is 1.5%, by weight.

EXAMPLE 3

40 g of an elastified polymethacrylate (density 1.03 g/cc; molecular weight about 55,000; viscosity of a 40% solution in toluene, at 20° C., 265 cP) are added to a solution of 160 g of chlorinated 1,4-cis-polyisoprene (chlorine content 66%, viscosity 10 cP (see above)) in 700 g of carbon tetrachloride, and the pH is adjusted to 9-10 using 5% aqueous soda solution. The resulting emulsion is then treated as described in Example 1. A product having a carbon tetrachloride content of 1.2% is obtained (viscosity of the product as a 20% solution in toluene at 20° C.: approximately 21 to 22 cP).

EXAMPLE 4

80 g of copolymer of butyl methacrylate and ethyl methacrylate (data still unknown) are added to a solution of 120 g of chlorinated 1,4-cis-polyisoprene (for data see Example 1) in 700 g of carbon tetrachloride. The solution is adjusted to pH 9-10 as in Example 1 and worked-up in the same manner. The carbon tetrachloride content in the dry product is 0.25%.

EXAMPLE 5

80 g of an elastified polymethacrylate (for data see Example 2) are added to a solution of 120 g of chlorinated polypropylene (viscosity of a 20% solution in toluene at 20° C.: 10cP; Cl content at least 64%, by weight) in 700 g of carbon tetrachloride. The solution is adjusted to pH 9-10 as in Example 1 and worked-up in analogous manner. The carbon tetrachloride content of the by-product is 0.4%.

EXAMPLE 6

100 g of an acrylate resin which contains OH groups (OH number 43; viscosity of a 50% solution in xylene at 20° C.: 260-450 cP) are added to a solution of 100 g of chlorinated cis-1,4-polyisoprene (for data see Example 1) in 700 g of carbon tetrachloride, and the solution is adjusted to pH 9-10 as in Example 1. The product is worked-up in the same way as in Example 1. The dry product contains less than 0.1% of carbon tetrachloride.

We claim:

1. A process for the preparation of a chlorinated aliphatic polymer which comprises chlorinating a chlorine-free aliphatic polymer in a chlorinated hydrocarbon as solvent using gaseous chlorine, adding to the resulting mixture from more than 25 to 50% by weight of a lacquer resin selected from the group consisting of alkyl resins, urethane-formaldehyde resins, melamine-formaldehyde, urea-formaldehyde, polymers and copolymers of alkyl-(meth) acrylates, copolymers of vinyl isobutylethers, copolymers of vinyl acetate with ethyl acrylate or butyl acrylate, xylene-formaldehyde resins, aldehyde and ketone resins, silicone resins, cellulose derivatives and hydrocarbon resins; and isolating the chlorinated aliphatic polymer by steam distillation.

2. A process as claimed in claim 1 wherein the aliphatic polymer is natural rubber, polyisoprene, polybutadiene, polyethylene, polypropylene and ethylene/propylene copolymers.

3. A process as claimed in claim 1 wherein the lacquer resin is a polymer or copolymer of an alkyl-(meth)acrylate.

* * * * *